March 2, 1926.
J. A. H. JOHNSTON
SHACKLE COVER
Original Filed Nov. 9, 1923
1,574,898
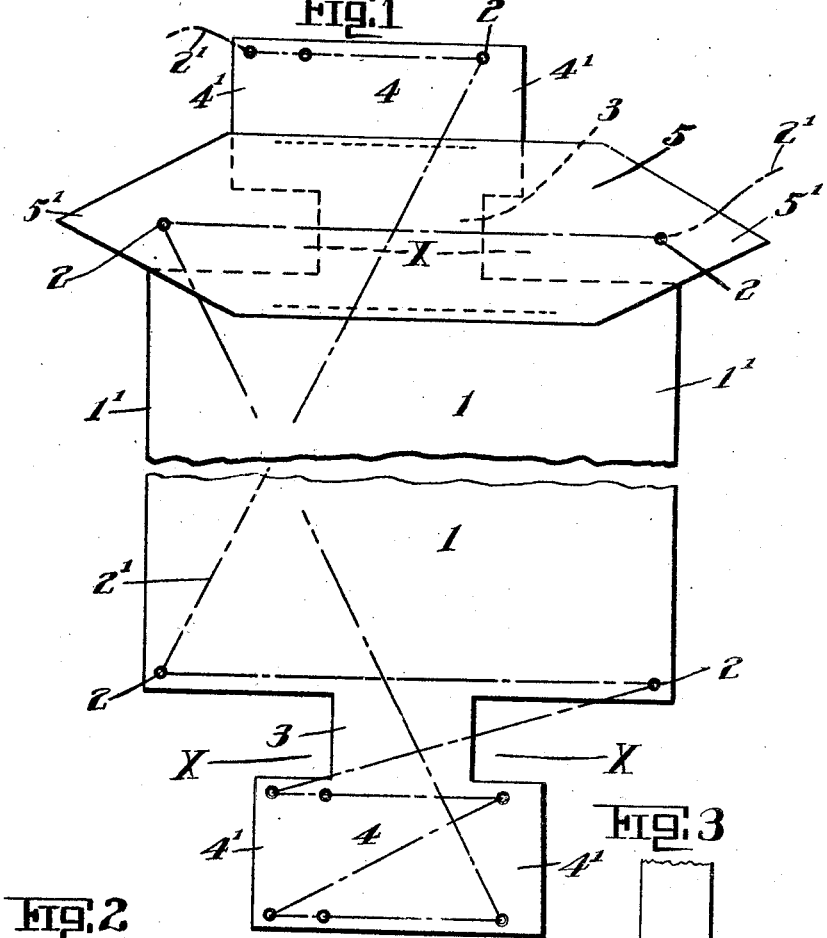
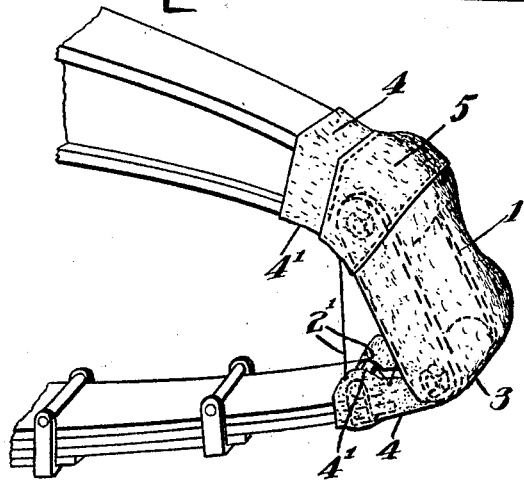
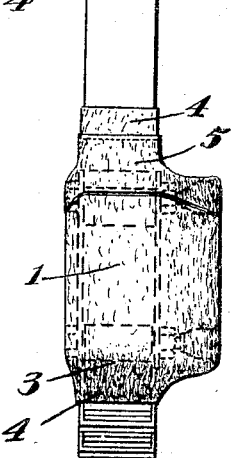
Inventor
Jason A. H. Johnston
By Ellis Spear Jr.
Attorney Patented Mar. 2, 1926.

1,574,898

UNITED STATES PATENT OFFICE.

JASON A. H. JOHNSTON, OF FRAMINGHAM, MASSACHUSETTS.

SHACKLE COVER.

Application filed November 9, 1923, Serial No. 673,846. Renewed August 17, 1925.

*To all whom it may concern:*

Be it known that I, JASON A. H. JOHNSTON, a subject of George V, King of England, residing at Framingham, county of Middlesex, Commonwealth of Massachusetts, have invented certain new and useful Improvements in Shackle Covers, of which the following is a specification.

This invention relates to shackle covers and particularly to such covers for automobiles and the like in which as standard construction a relatively short shackle is employed to connect either a portion of springs or a spring and a frame. Such shackles exposed as they are to mud and dust, water, oil and tar, become fouled very rapidly by the accumulation of extraneous matter which is particularly apt to catch in any exudation of the internal lubrication which is so necessary in such a part.

The desirability of complete lubrication of the shackle bolts is obvious and completeness of lubrication on the average renders unavoidable a certain amount of exudation in the region of the lubricated bearing. This makes of such shackle connection a region of menace to clothing and of uncomfortable uncleanliness, especially as some of the shackles at least are bound to be in an exposed position with which driver, passenger or pedestrian is apt to come in contact.

There is furthermore immediately adjacent the shackle usually the end of one or more spring leaves. In the case of an inverted leaf spring, these leaf ends are particularly exposed to water and dirt and are thus liable to become rusted or fouled. I have found that by protecting a spring at this point substantial freedom from rust between the leaves and the consequent squeaks may be avoided as the remainder of the spring is subjected to relatively little movement of its parts with a decreasing liability of the admission of dirt or water.

The difficulty of protecting the shackle region lies first in the fact that there are usually three parts capable of independent movement and also those difficulties due to the presence of grease cups, nipples or other lubricating devices which usually constitute projections and which must be accessible for the replenishment of lubrication.

In accordance with my invention I provide a cover which by reason of its construction affords the desired protection and convenience, is readily installed and which in the form selected for illustration herein is easily and economically produced. Throughout the specification and drawings like reference characters indicate corresponding parts and in the drawings:

Fig. 1 is a plan view of the cover in accordance with my invention, and

Fig. 2 is a view of the same applied.

Fig. 3 is a fragmentary end view of Fig. 2.

In the form shown I provide a body portion 1 of general rectangular form, the lateral edges 1' of which are adapted to be drawn about the shackle proper and may be conveniently fastened as by lacing studs 2 and any suitable lacing as at 3. The body portion 1 is of a length substantially equal to the length of the shackle and is connected by a web at each end as indicated at 3 with a shorter rectangular portion 4, the ends of which 4' constitute flaps adapted to be drawn around the end of the adjacent leaf spring or frame.

The portion 3 should preferably be of about the width of the shackle member and should be of such a length that the adjacent portions 1 and 4 which define the sides of the intervening space X will come together with only a slight fullness just sufficient to cover the enlargements which are usually present at the end of the shackle bolts.

As these enlargements are sometimes considerable especially as on one side at least, they include some projecting lubricating device or connection, I preferably provide for this area an overlying cape 5. This cape is preferably attached centrally to either the body or end portions or the connecting web 3. It is preferably tapered at its ends as at 5' and these ends are provided with some suitable fastening means as the lacing hook 2. The cape 5 therefore not only covers any openings left between the end and body portions but permits the grease cup or nipple to be left exposed between these parts, but easily covered by the flap so that access may be had to it without the necessity of unlacing the other parts.

My shackle cover may be variously proportioned to conform to different shackle constructions and arrangements and the parts may be variously devised all without departing from the spirit of my invention if within the limits of the appended claims.

What I therefore claim and desire to secure by Letters Patent is:

1. A shackle cover comprising a body portion of substantially the length of the shackle only and of a width sufficient to substantially completely enclose the shackle, end flaps of relatively less area than said body portion connected to the ends of said body portion and adapted to be drawn about the adjacent ends of the shackled members, and fasteners on the margins of said body portion and said end flaps for securing the shackle cover in the position described.

2. A shackle cover comprising a flapped body portion of substantially the length of the shackle and a flapped end portion connected thereto by a short web of less width and having lateral notches and a flapped cape portion overlying said connecting web and adapted to cover the intervening lateral notches.

3. A cover for the shackle of an automobile spring and the like comprising a body portion and end portions separated by lateral notches adjacent the position of the shackle eyes and an overlying flapped portion and adapted to cover said notch portions when in position and means for fastening the edges of the cover and overlying portions.

4. A cover for the shackle of an automobile spring and the like comprising a body portion and end portions separated by lateral notches adjacent the position of the shackle eyes and an overlying flapped portion having tapered ends and adapted to cover said notch portions when in position and means for fastening the edges of the cover and overlying portions.

5. A shackle cover for automobile springs and the like comprising a rectangular body portion of substantially the length of the shackle and adapted to be disposed about the shackle and a pair of shorter rectangular end portions adapted to be disposed about the adjacent end of a spring or frame, narrow connecting webs between said body and said end portions and a cape strip attached to said connecting web and having tapered ends adapted to be drawn about and to cover the eye portions of the shackle and means for fastening together the opposite edges of said portions.

In testimony whereof I affix my signature.

JASON A. H. JOHNSTON.